US010057378B2

(12) United States Patent
Kosim-Satyaputra et al.

(10) Patent No.: US 10,057,378 B2
(45) Date of Patent: Aug. 21, 2018

(54) SYSTEMS AND METHODS FOR API RATE LIMITING AND DISTRIBUTION

(71) Applicant: Big Commerce Pty. Ltd., Ultimo (AU)

(72) Inventors: Qamal Kosim-Satyaputra, Kingsford (AU); Scott Lachlan Christopher, Oyster Bay (AU)

(73) Assignee: BIGCOMMERCE PTY. LTD., Ultimo (AU)

( * ) Notice: Subject to any disclaimer, the term of this patent is extended or adjusted under 35 U.S.C. 154(b) by 404 days.

(21) Appl. No.: 14/618,719

(22) Filed: Feb. 10, 2015

(65) Prior Publication Data

US 2015/0229579 A1     Aug. 13, 2015

Related U.S. Application Data

(60) Provisional application No. 61/938,038, filed on Feb. 10, 2014.

(51) Int. Cl.
*H04L 29/06*     (2006.01)
*H04L 29/08*     (2006.01)

(52) U.S. Cl.
CPC .............. *H04L 67/42* (2013.01); *H04L 67/02* (2013.01); *H04L 67/1031* (2013.01); *H04L 67/2842* (2013.01); *H04L 67/2876* (2013.01)

(58) Field of Classification Search
CPC . H04L 67/42; H04L 67/1031; H04L 67/2876; H04L 67/2842; H04L 67/02
See application file for complete search history.

(56) References Cited

U.S. PATENT DOCUMENTS 6,175,879 B1 *  1/2001  Shah ..................... G06F 9/547
                                                            719/330
8,417,823 B2 *  4/2013  Luna .................... H04W 28/14
                                                            709/213
8,621,490 B2 * 12/2013  Billingsley .............. G06F 8/61
                                                            709/226
9,313,604 B1 *  4/2016  Holcombe ............ H04W 4/001
                    (Continued)

OTHER PUBLICATIONS

Erwin Harahap et al, "Modeling of Router-based Request Redirection for Content Distribution Network", International Journal of Computer Applications (0975-8887) vol. 76—No. 13, Aug. 2013.*

(Continued)

*Primary Examiner* — Dustin Nguyen
*Assistant Examiner* — Javier O Guzman
(74) *Attorney, Agent, or Firm* — Sprinkle IP Law Group (57) ABSTRACT

An API rate limiting system may receive a client request from an API client associated with a tenant, formulate a proxied request with an internal authentication specific to the tenant, and send the proxied request to API endpoints (tenant resources) at a store. The store fulfills the request, accessing and modifying local database(s) as needed, and returns a response to the system. The system returns the response to the API client along with information about the API client's quota for the current time window. The system may calculate the quota based on a resource limit with respect to a number of clients accessing a resource. In some embodiments, the system may implement an exponential distribution function in making a determination on a quota per API client per time window.

15 Claims, 5 Drawing Sheets

(56) References Cited

U.S. PATENT DOCUMENTS

| | | | |
|---|---|---|---|
| 9,456,050 B1* | 9/2016 | Lepeska | H04L 67/2847 |
| 2004/0186951 A1* | 9/2004 | Iren | H04N 21/2326 |
| | | | 711/112 |
| 2008/0209451 A1* | 8/2008 | Michels | G06F 15/16 |
| | | | 719/328 |
| 2010/0217837 A1 | 8/2010 | Ansari et al. | |
| 2010/0287303 A1 | 11/2010 | Smith et al. | |
| 2012/0180022 A1 | 7/2012 | Hopkins | |
| 2013/0212603 A1* | 8/2013 | Cooke | G06F 9/542 |
| | | | 719/328 |
| 2014/0376368 A1* | 12/2014 | Xiao | H04L 47/12 |
| | | | 370/230 |
| 2015/0095137 A1* | 4/2015 | Savelli | G06Q 30/0242 |
| | | | 705/14.41 |
| 2015/0220376 A1* | 8/2015 | Srivastava | G06F 11/327 |
| | | | 714/37 |

OTHER PUBLICATIONS

International Preliminary Report on Patentability issued for PCT Patent Application No. PCT/US2015/015230, dated Aug. 16, 2016, 5 pages.

International Search Report and Written Opinion issued for PCT Patent Application No. PCT/US2015/015230, dated May 18, 2015, 7 pages.

Harahap et al., "Modeling of Router-Based Request Redirection for Content Distribution Network," IJCA—International Journal of Computer Applications, Aug. 2013, [Retrieved from <<http://research.ijcaonline.org/volume76/number13/pxc3890857.pdf>>, 10 pages.

* cited by examiner

SYSTEMS AND METHODS FOR API RATE LIMITING AND DISTRIBUTION

CROSS-REFERENCE TO RELATED APPLICATION(S)

This is a conversion of and claims a benefit of priority from U.S. Provisional Application No. 61/938,038, filed Feb. 10, 2014, entitled "SYSTEM AND METHOD FOR API RATE LIMITING AND DISTRIBUTION," which is fully incorporated herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to multi-tenancy architectures. More particularly, embodiments disclosed herein relate to systems and methods for limiting and distributing API rate usage among multiple applications in a multi-tenant platform.

BACKGROUND OF THE RELATED ART

A multi-tenancy architecture refers to a principle in software architecture in which a single instance of the software such as an electronic commerce (ecommerce) web site running on a server machine can serve multiple client organizations (tenants). Although tenants in such a multi-tenant computing environment share the same ecommerce web site, they do not share or see each other's data. Furthermore, each tenant has a "sandbox" of limited resources defined by a number of constraint policies. Such policies may be defined due to infrastructural limitations and/or for business reasons. Each tenant may have one or more applications running on the ecommerce web site. These applications are limited to the resources defined by the policy or policies for the particular tenant.

When multiple applications associated with a tenant require access to resources through an application programming interface (API), the multi-tenant platform supporting the ecommerce web site needs to be able to limit and distribute the API requests in such a way that it enforces the policy or policies and equitably distributes quota across all requesting applications.

Figure 1:
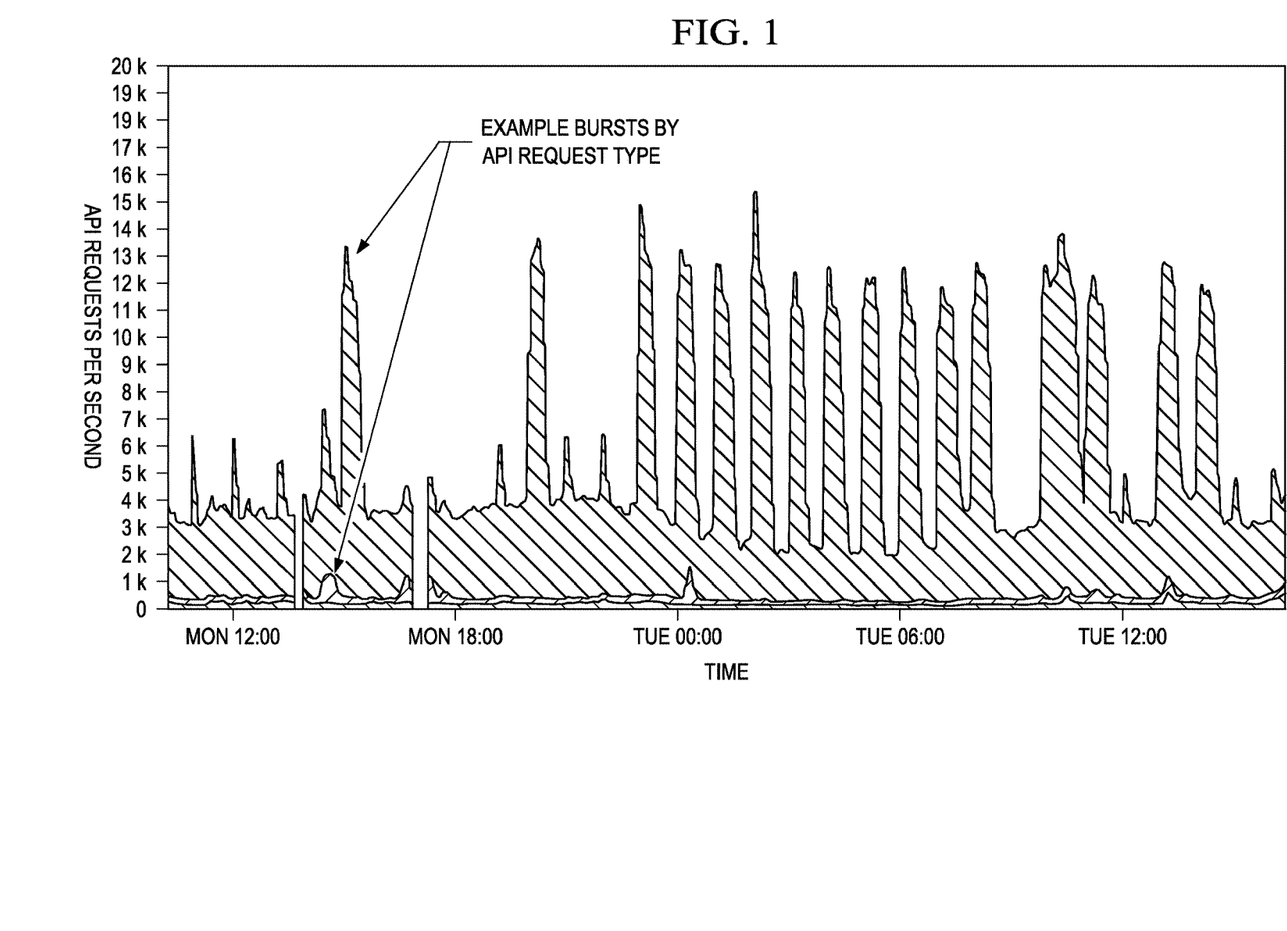
FIG. 1 is a diagram illustrating an example of API requests and burst behavior.

One solution to address this need is to set a hard limit quota on the shared infrastructure over a fixed period of time. However, this solution can cause problems when a high throughput client consumes the API and exhausts the hard limit in a short period of time. This sort of bursting behavior puts a significant amount of load in a shared infrastructure and may affect other tenants. An example of such a usage pattern is shown in FIG. 1.

In a networked environment, most systems have used some sort of time based rate limiting algorithms to throttle requests and access rates. Examples of time based rate limiting algorithms include the leaky bucket and token bucket algorithms. However, time based rate limiting algorithms are not without their drawbacks. Consequently, there is room for innovations and improvements.

SUMMARY

Time based rate limiting solutions are relatively difficult for clients to honor limits and do not cater for on-demand changes (e.g., the number of connecting clients, on demand limit adjustment, etc.). Further, they do not provide for requirements such as:

Allow variable limit on resources depending on tenant configuration

Provide equitable amount of access (quota) to resources for multiple clients

Allow reasonable bursting capacity

Allow clients to easily honor limits

Embodiments disclosed herein allow applications to have an equitable amount of access to resources with a generous bursting capacity. Advantageously, embodiments allow for variable limits on resources depending on tenant configuration; provide equitable amounts of access (quota) to resources for multiple clients; allow reasonable bursting capacity; and allow clients to easily honor limits.

Some embodiments of an API rate limiting system disclosed herein may include an API proxy system embodied on non-transitory computer memory storing instructions translatable by at least one processor to receive a client request from an application (an API client) associated with a tenant, formulate a proxied request with an internal authentication specific to the tenant, and send the proxied request to API endpoints (tenant resources) at a store. The store fulfills the request, accessing and modifying local database(s) as needed, and returns a response to the API proxy system. The API proxy system returns the response to the requesting API client along with information about timing. The API proxy system is responsible for returning an appropriate response to the client when the quota has been reached for a configured time window. Thus, the API proxy system may calculate quotas based on a resource limit with respect to a number of clients accessing a resource and include in the response to the client some sort of timeout period which the client can use to sleep their requests until the time window elapses.

In some embodiments, the number of API requests permitted may be determined based on a number of active API clients connected to the API proxy system during the time window. In some embodiments, the API proxy system may implement an exponential distribution function in making a determination on a quota per API client per time window.

One embodiment comprises a system having a processor and non-transitory computer memory including instructions translatable by the processor to perform a method substantially as described herein. Another embodiment comprises a computer program product having at least one non-transitory computer-readable storage medium storing instructions translatable by at least one processor to perform a method substantially as described herein.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As will be discussed in greater detail below, embodiments disclosed herein can provide a fraction of a tenant's API request quota with a generous bursting capacity to API clients. Examples of API clients may include applications associated with the particular tenant which operates on a multi-tenant platform. Various types of API requests from such applications may be accommodated, including "replace select," "update multi," "insert select," "delete multi," "load data," "delete," "replace," "update," "insert," "select," "questions," etc.

In some embodiments, the quota may have a variable time window and can scale down exponentially depending on the number of residents (applications installed/authorized) with a tunable scaling factor. In some embodiments, the load in servicing these API requests can thus be mitigated via two variables—the time window to reduce volume per time interval (thereby spreading the load over time) and the scaling factor to lower the bursting capacity of each application (fairness of quota with respect to number of residents). In this case, "residents" may refer to applications or API clients that are installed in an online store and that are to share the API request limit of the particular tenant operating on the multi-tenant platform.

These API clients may have greatly varying API request needs. For example, some applications, such as live chat applications, may have little or no API request needs; some may have medium API request needs; and some may have heavy duty API request needs for multichannel sales, comparison shopping engine feed, or e-commerce data feed, etc.

A tenant with ten applications may only have one or two heavy duty APIs using these applications at any given time, and the tenant may want these particular APIs to have higher rate limits than the other APIs (so as not have them "penalized" just because they installed some "light duty" applications in their store). As will be explained in greater detail below, to address this, embodiments count a "number of clients" as active in the time window, not installed. Thus, if a store has five (5) active "API light" applications (e.g., applications that may have little or no API request needs) and one (1) active "API heavy" application (e.g., an application that may have to deal with orders, etc.), then the API heavy application will get all or most of the API requests available.

In this way, embodiments allow for configuring an online store hard limit on a per plan basis as the tenant's business scale up with more applications as naturally as the number of applications increases and the API calls per quota decreases.

In some embodiments, it is not the API rate that is limited, but the quota per a time window that is limited. For example, if a quota is 86 requests per a 60-second time window, an API client can send up to 86 requests so long as they are all sent within that one minute window. The API client can spread the 86 requests over the one minute window or, if the API client is configured for speed through parallel requests, they can crunch through the 86 requests in the first 4 seconds of that one minute window via, for instance, 20 concurrent requests. However, they will have to wait 56 seconds until they can hit the platform's API again with another request in the next time window.

As mentioned above, some API requests are heavier (e.g., require more resources) than others. Thus, the application quota may vary from tenant to tenant. For example, if a tenant wishes to be able to send 300 API requests per a minute, the time window may need to be adjusted so as to limit the bursting capacity.

Figure 2:
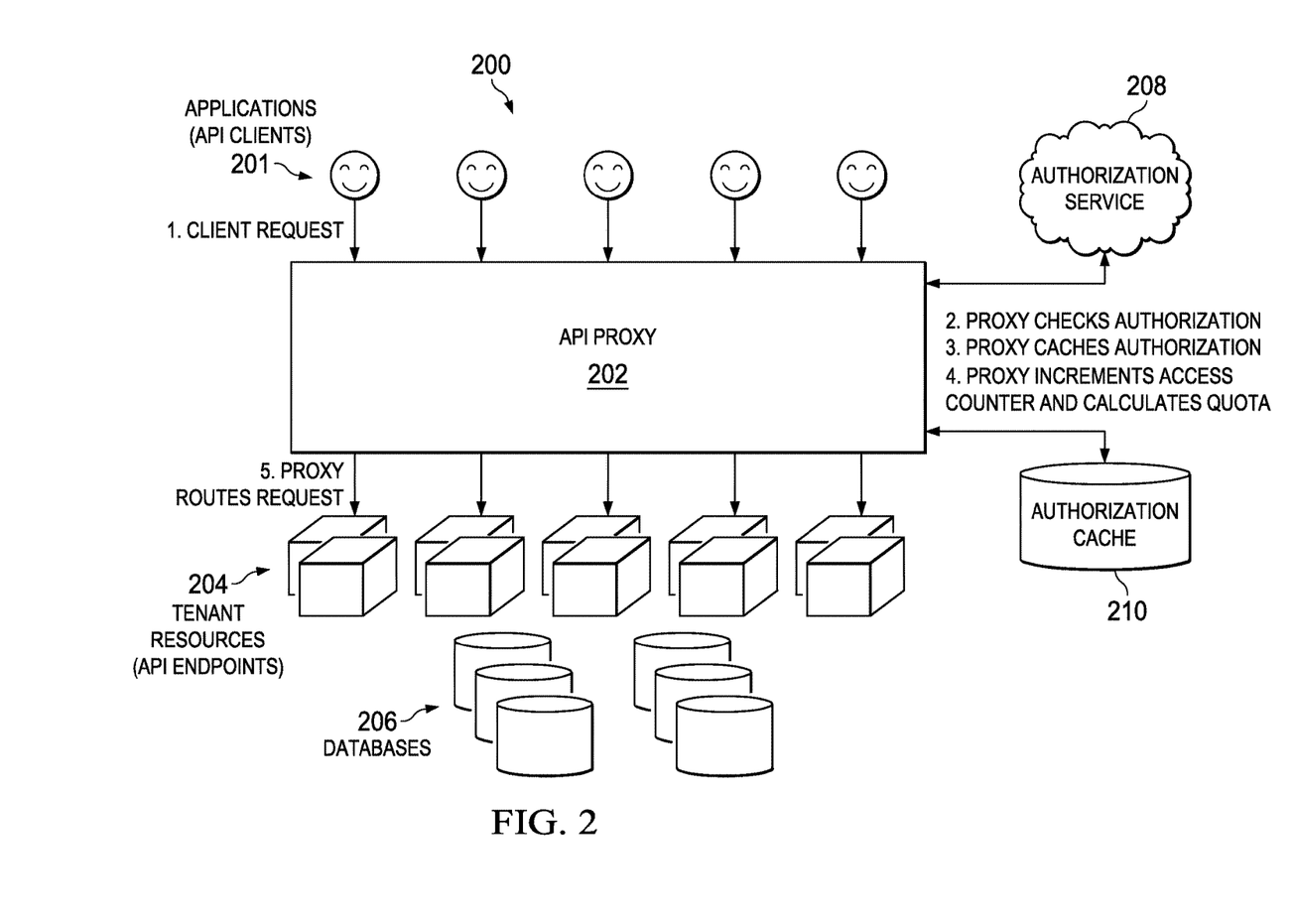
FIG. 2 depicts a diagrammatic representation of a system architecture in which embodiments disclosed herein may be implemented.

Turning now to FIG. 2, system 200 may implement a multi-tenancy architecture in which ecommerce software running on one or more server machines can serve multiple client entities or organizations (tenants). The server machine(s) may reside in one or more data centers or be hosted in a cloud computing environment. Each tenant (via one or more authorized users) of system 200 can browse, install, and manage one or more applications and access their resources (tenant resources) via a user interface of system 200 (e.g., a control panel, dashboard, etc.).

As shown, the system includes one or more applications (API clients) 201, API proxy system 202, and tenant resources 204. In some embodiments, API proxy system 202 may reside on a cluster of server machines with a set load balancers. For example, a front end load balancer may communicate with several backend API proxy processes at any given time. Depending upon the load at the time, some embodiments may have 5-10 API proxy processes running on a plurality of server computers that implement the control logic disclosed herein. In some embodiments, API proxy system 202 may or may not reside in the same data center as tenant resources 204. In some embodiments, API proxy system 202 and tenant resources 204 are hosted or the same or different cloud computing environment. In some embodiments, API proxy system 202 may further include or be communicatively coupled to authorization service 208 which, in some embodiments, may be part of system 200 or hosted separately in a cloud computing environment. In some embodiments, authorization service 208 is configured to independently determine whether an incoming API request is authorized. To avoid having to make the same API request again, in some embodiments, API proxy system 202 may cache at least a copy of an authorization, a result of the authorization, and counter information that describes traffic flow pattern in authorization cache 210. In some embodiments, authorization cache 210 may be implemented on a machine local to API proxy system 202. In some embodiments, authorization cache 210 may be an in-memory cache.

As discussed above, in some embodiments, tenant resources 204 may be in the same data center as API proxy system 202. However, tenant resources 204 may be managed separately. Specifically, tenant resources 204 may reside on particular server computers and have particular processes for handling incoming requests. In this disclosure, tenant resources 204 are considered API endpoints within each store with which API proxy system 202 communicates.

As will be discussed in greater detail below, in some embodiments, API proxy system 202 can distribute and throttle requests over available resources owned by tenants of system 200. Additionally, API proxy system 202 can handle authentication, access management, and rate limiting, including usage quota calculations. API proxy system 202 embodies any required business logic related to access distribution to tenant owned resources and/or internal services.

In some embodiments, API proxy system 202 may receive a client request (e.g., an HTTP request) from an application (an API client) associated with a tenant. Those skilled in the art will appreciate that various HTTP methods such as HEAD, GET, POST, PATCH, DELETE, etc. can be used to indicate desired actions such as retrieving and sending information, as well as creating, updating, and deleting database records. For example, HTTP GET and HTTP POST methods may be used to send and receive content to and from a REST API resource.

In some embodiments, API proxy system 202 may formulate a proxied request with an internal authentication (e.g., specific to the tenant with which the API client is associated), and send the proxied request to referenced API endpoint(s) (per resource name(s) referenced in the client request) at a store.

The store fulfills the proxied request, accessing and modifying local database(s) 206 as needed (e.g., creating a new record, updating an account, deleting a product in the store, etc.), and returns a response to API proxy system 202. API proxy system 202 returns the response to the requesting API client along with information about timing. API proxy system 202 is responsible for returning an appropriate response to the client when the quota has been reached for a configured time window. Thus, API proxy system 202 may calculate quotas based on a resource limit with respect to a number of clients accessing a resource and include in the response to the client some sort of timeout period which the client can use to sleep their requests until the time window elapses.

Specifically, in some embodiments, API proxy system 202 may allocate tenant resource accesses by calculating a usage quota based on a configured limit of a target resource and a configurable time window with a tunable scaling factor which can scale up or down depending upon the number of requesting applications. This allows API proxy system 202 to handle any API client that is making too many requests (and therefore should be throttled back) during a certain time window. API proxy system 202 not only handles the throttling, it also informs the API client in the response that they need to shape their traffic in order to avoid interruption. This feedback can help the API client's application developer(s) to modify their future API requests.

Figure 3:
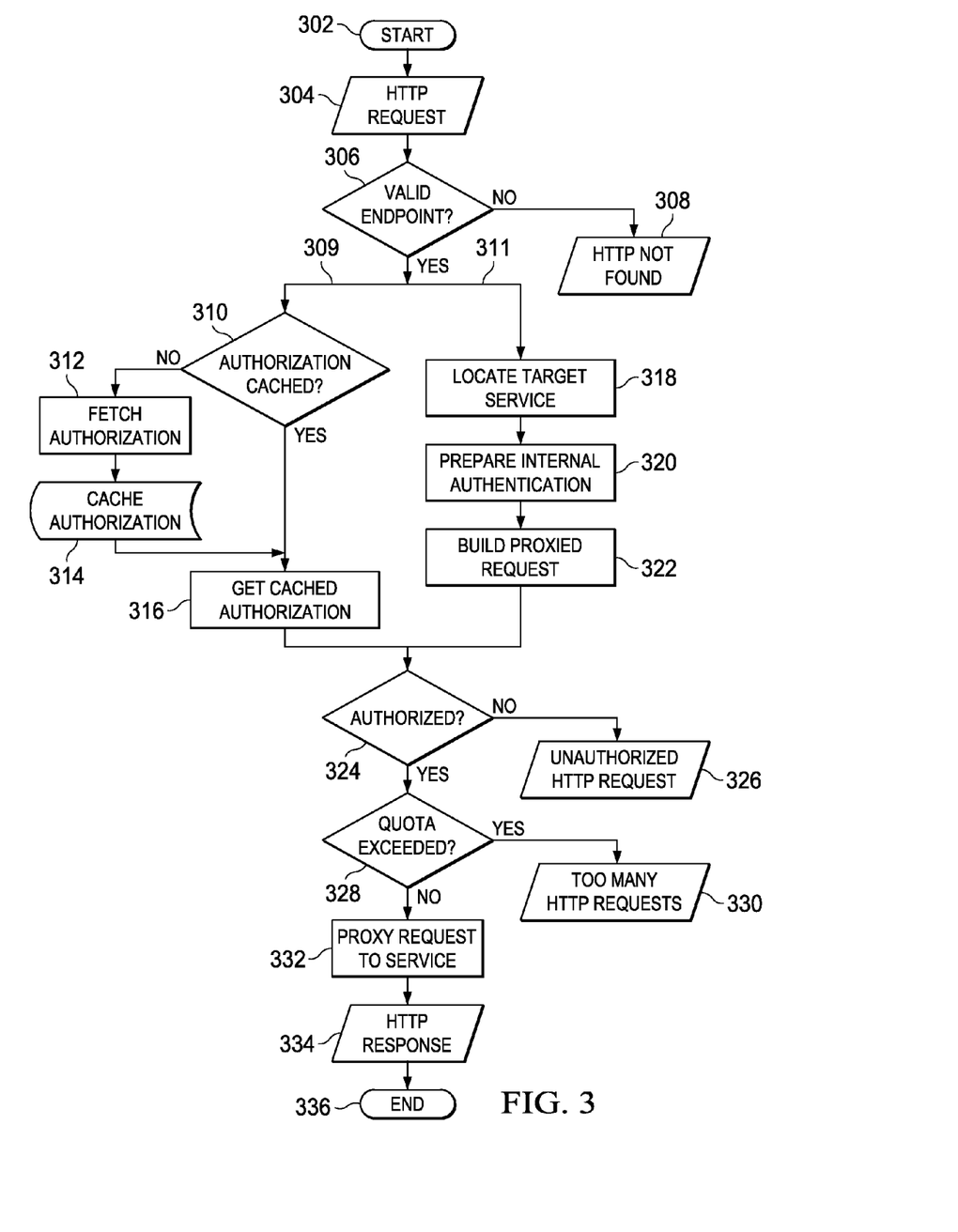
FIG. 3 depicts a diagrammatic representation of an example process flow of an embodiment of an API proxy system disclosed herein.

An example of a process flow of API proxy system 202 is illustrated in flowchart 300 shown in FIG. 3. The process starts at 302. At 304, the process (e.g., a process implementing control logic embodied on API proxy system 202 shown in FIG. 2) may receive an HTTP request from an API client.

At 306, the process may determine if the HTTP request references a valid API endpoint. If not, then an error message is sent to the API client (308). If a valid API endpoint exists, however, paths 309 and 311 are followed.

In path 311, a target tenant service is located (318). The process may prepare an internal authentication specific to the requesting API client (320) and use the internal authentication to build a proxied request supported by the particular API endpoint (322).

In path 309, the process may first check a local cache (e.g., authorization cache 210 shown in FIG. 2) and determine whether an authorization entry associated with the API client has been cached (310). If not, the process may attempt to obtain (via authorization service 208 shown in FIG. 2) necessary authorization (312). The process may cache a result of the authorization request (314). If an authorization entry was found (or is now cached) in the local cache (310), the process obtains it from the local cache (316) and determines whether the client request is authorized (324). If the client request is not authorized, an appropriate message (e.g., "unauthorized HTTP request") is returned (326). If the client request is authorized, the process may determine whether a quota for the particular API client has been exceeded (328). If so, a denial message (e.g., "too many HTTP requests") is returned to the API client (330), indicating that too many requests have been received by the target API endpoint during the time window. If the quota for the particular API client has not been exceeded, a proxy of the client request (a proxied request with internal authentication) is provided to the validated API endpoint (the target tenant service), at 332. The process receives a response from the tenant service and returns an appropriate HTTP response to the requesting API client (334). The process ends at 336.

Figure 4:
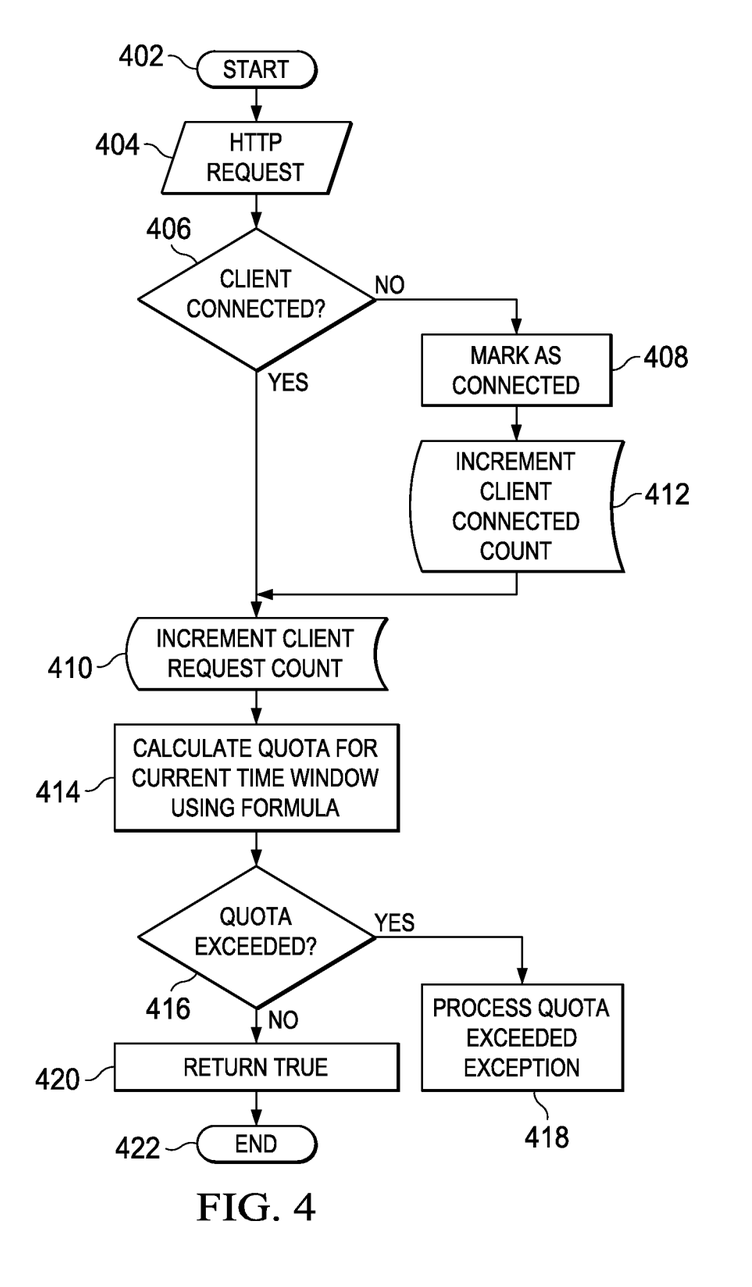
FIG. 4 is a flowchart illustrating an example method of determining a usage quota in accordance with some embodiments.

An example method of determining a usage quota is illustrated in a flowchart shown in FIG. 4. The process begins at 402. At 404, the process may receive a client request from an API client as described above. At 406, the process may determine whether the API client is already connected. If not, the process marks the API client as connected (408) and increment a first counter tracking the number of clients connected to the process at the time (412). Regardless of whether the API client is already connected, the process increments a second counter tracking the number of client requests from the API client (410).

Next, the process calculates a quota of client requests allowed for the API client for a current time window (414). This is explained in greater detail below. The process compares the calculated quota with the number of client requests received from the API client during the current time window and determines whether the quota has been exceeded (416). If so, the process handles any potential exception that may be applied with the quota has been exceeded (418). If the quota has not been exceeded, the process returns a "TRUE" value (420) indicating that the system may proceed to process the client request. The process ends at 422.

In some embodiments, control logic implementing the processes described above may be implemented by one or more components of API proxy system 202. For example, in some embodiments, API proxy system 202 may include an API proxy engine configured to perform the processes of FIGS. 3 and 4. In some embodiments, API proxy system 202 may include an API proxy engine configured to perform the process of FIG. 3 and an API rate limiting engine configured to perform the process of FIG. 4. Such API proxy engine and/or API rate limiting engine may be embodied on non-transitory computer memory of API proxy system 202, including instructions translatable by at least one processor of API proxy system 202.

In some embodiments, a quota per a time window can be determined using an exponential distribution formula. In some embodiments, the following formula may be used to calculate time window quotas based on a resource limit with respect to a number of clients accessing a resource:

$$\frac{S \times (1 - e^{-\lambda(n+d)}) \times w}{n \times c}$$

where C represents a configurable constant (e.g., 3600), S represents a resource limit per timeframe (e.g., an hour according to one embodiment), n represents a number of connected clients, w represents a time window (e.g., in seconds according to one embodiment), $\lambda$ represents a tunable scaling or growth factor, and d represents a multiplier.

The variable S may be assigned in a predetermined fashion by a service provider based on domain knowledge. The time window w may be adjusted by the API proxy system to change the volume per timeframe. The tunable scaling factor $\lambda$ likewise may be adjusted by the API proxy system to account for bursty behavior and may depend on the number of requesting applications (API clients). The scaling factor may be adjusted, for example, for a particular tenant based on whether that tenant should be allowed more accesses. The multiplier d may also be tunable. One or more of these adjustments may be made by API proxy system for a particular API client, at any given time.

The exponential distribution formula described above is particularly formulated to effectively distribute the reflected resource capacity. In some embodiments, the quote calculation can be updated every time an API request from an API client is received at the API proxy system.

As explained above, the API proxy system is responsible for returning an appropriate response to the API client when the quota has been reached for the particular time window.

Figure 5:
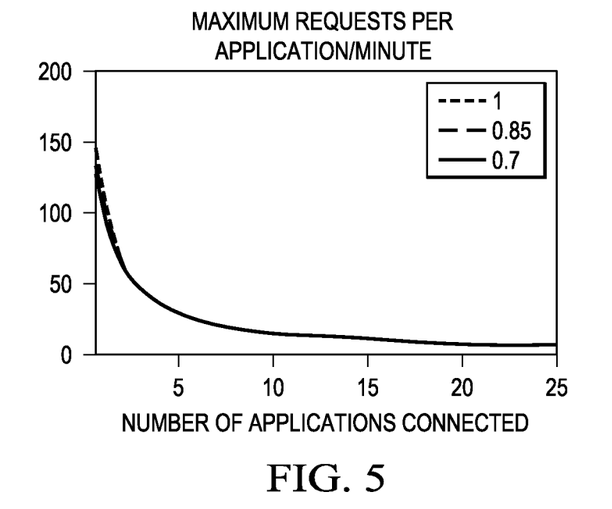
FIG. 5 is a plot diagram illustrating an example of quota degradation over the number of connected clients in accordance with some embodiments.

Shown in Table 1 below is an example of determining an application quota with a 30 second time window. The table is plotted in the graph of FIG. 5, which illustrates quota degradation over the number of connected clients. In this example, the number of API requests allowed per client decreases exponentially as the number of connected clients increases.

TABLE 1

| Number of clients | $\lambda = 1$, $d = 1.3$ | $\lambda = 0.85$, $d = 1.3$ | $\lambda = 0.7$, $d = 1.3$ |
|---|---|---|---|
| 1 | 150 | 143 | 133 |
| 2 | 80 | 78 | 75 |
| 3 | 55 | 54 | 53 |
| 4 | 41 | 41 | 41 |
| 5 | 33 | 33 | 33 |
| 6 | 28 | 28 | 28 |
| 7 | 24 | 24 | 24 |
| 8 | 21 | 21 | 21 |
| 9 | 19 | 19 | 19 |
| 10 | 17 | 17 | 17 |
| 11 | 15 | 15 | 15 |
| 12 | 14 | 14 | 14 |
| 13 | 13 | 13 | 13 |
| 14 | 12 | 12 | 12 |
| 15 | 11 | 11 | 11 |
| 16 | 10 | 10 | 10 |
| 17 | 10 | 10 | 10 |
| 18 | 9 | 9 | 9 |
| 19 | 9 | 9 | 9 |
| 20 | 8 | 8 | 8 |
| 21 | 8 | 8 | 8 |
| 22 | 8 | 8 | 8 |
| 23 | 7 | 7 | 7 |
| 24 | 7 | 7 | 7 |
| 25 | 7 | 7 | 7 |

Figure 6:
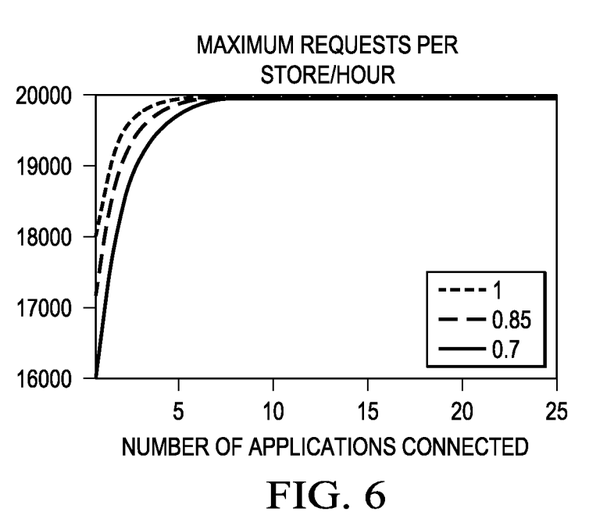
FIG. 6 is a plot diagram illustrating an example of load distribution over time during a congested situation in accordance with some embodiments.

Shown in Table 2 below is an example of a maximum (20,000) requests per store per hour. This table is plotted in FIG. 6, which shows load distribution over time during a congested situation.

TABLE 2

| Number of clients | $\lambda = 1$, $d = 1.3$ | $\lambda = 0.85$, $d = 1.3$ | $\lambda = 0.7$, $d = 1.3$ |
|---|---|---|---|
| 1 | 17995 | 17169 | 16002 |
| 2 | 19262 | 18790 | 18015 |
| 3 | 19729 | 19483 | 19014 |
| 4 | 19900 | 19779 | 19510 |
| 5 | 19963 | 19906 | 19757 |
| 6 | 19986 | 19960 | 19879 |
| 7 | 19995 | 19983 | 19940 |
| 8 | 19998 | 19993 | 19970 |
| 9 | 19999 | 19997 | 19985 |
| 10 | 20000 | 19999 | 19993 |
| 11 | 20000 | 19999 | 19996 |
| 12 | 20000 | 20000 | 19998 |
| 13 | 20000 | 20000 | 19999 |
| 14 | 20000 | 20000 | 20000 |
| 15 | 20000 | 20000 | 20000 |
| 16 | 20000 | 20000 | 20000 |
| 17 | 20000 | 20000 | 20000 |
| 18 | 20000 | 20000 | 20000 |
| 19 | 20000 | 20000 | 20000 |
| 20 | 20000 | 20000 | 20000 |
| 21 | 20000 | 20000 | 20000 |
| 22 | 20000 | 20000 | 20000 |
| 23 | 20000 | 20000 | 20000 |
| 24 | 20000 | 20000 | 20000 |
| 25 | 20000 | 20000 | 20000 |

The results are summarized in Table 3 below:

TABLE 3

| Number of connected clients | Max Store Request/HR | Quota/Time Window | Quota/HR |
|---|---|---|---|
| 1 | 17995 | 150 | 18000 |
| 2 | 19262 | 80 | 9600 |
| 3 | 19729 | 55 | 6600 |
| 4 | 19900 | 41 | 4920 |

TABLE 3-continued

| Number of connected clients | Max Store Request/HR | Quota/Time Window | Quota/HR |
|---|---|---|---|
| 5 | 19963 | 33 | 3960 |
| 6 | 19986 | 28 | 3360 |
| 7 | 19995 | 24 | 2880 |
| 8 | 19998 | 21 | 2520 |
| 9 | 19999 | 19 | 2280 |
| 10 | 20000 | 17 | 2040 |
| 11 | 20000 | 15 | 1800 |
| 12 | 20000 | 14 | 1680 |
| 13 | 20000 | 13 | 1560 |
| 14 | 20000 | 12 | 1440 |
| 15 | 20000 | 11 | 1320 |
| 16 | 20000 | 10 | 1200 |
| 17 | 20000 | 10 | 1200 |
| 18 | 20000 | 9 | 1080 |
| 19 | 20000 | 9 | 1080 |
| 20 | 20000 | 8 | 960 |
| 21 | 20000 | 8 | 960 |
| 22 | 20000 | 8 | 960 |
| 23 | 20000 | 7 | 840 |
| 24 | 20000 | 7 | 840 |
| 25 | 20000 | 7 | 840 |

Embodiments disclosed herein can provide many advantages. For example, a system implementing an embodiment disclosed herein can provide configurable metrics to scale the quota for the clients. The system can allow generous quota depending on the number of connected clients, with graceful degradation. The system can offload authentication and access control from resources to the proxy. Furthermore, the system can allow complex rules for clients that could be leveraged as monetization of access. The system can provide a more stable usage pattern with a predictable throughput within a reasonable range which can be adjusted over time as the platform infrastructure evolves.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be embodied on distributed, or networked systems which may include hardware components and/or circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
receiving, by an application programming interface (API) proxy system embodied on a cluster of server machines, a client request from an API client;
the API proxy system calculating a quota of requests allowed for the API client for a current time window based at least in part on a number of active API clients during the current time window and a tunable scaling factor, wherein the quota of requests allowed for the API client for the current time window is calculated using an exponential distribution function, wherein the exponential distribution function is formulated as:

$$\frac{S \times (1 - e^{-\lambda(n+d)}) \times w}{n \times c}$$

where S represents a resource limit per time frame, n represents the number of active API clients, w represents the current time window, $\lambda$ represents the tunable scaling factor, d represents a multiplier, and C represents a configurable constant;
if the quota has been exceeded for the API client for the current time window, the API proxy system determining whether an exception is applicable;
if the quota has not been exceeded for the API client for the current time window, the API proxy system preparing a proxied request and forwarding the proxied request to one or more API endpoints referenced in the client request from the API client; and
adjusting a value of the current time window to change a volume per timeframe.

2. The method according to claim 1, wherein C is 3600.

3. The method according to claim 1, further comprising:
adjusting the tunable scaling factor to account for burst behavior of the API client; or
adjusting the value of the current time window and the tunable scaling factor.

4. The method according to claim 1, further comprising:
tracking a number of client requests from the API client for the current time window; and
comparing the number of client requests from the API client for the current time window with the quota of requests allowed for the API client for the current time window.

5. The method according to claim 1, further comprising:
tracking the number of active API clients, wherein tracking the number of active API clients comprises:
determining whether the API client is already connected; and
if the API client is not already connected:
marking the API client as connected; and
incrementing a counter tracking the number of active API clients.

6. An application programming interface (API) proxy system, comprising:
at least one processor;
non-transitory computer memory;
instructions embodied on the non-transitory computer memory and translatable by the at least one processor to perform:
receiving a client request from an API client;
calculating a quota of requests allowed for the API client for a current time window based at least in part on a number of active API clients during the current time window and a tunable scaling factor, wherein the quota of requests allowed for the API client for the current time window is calculated using an exponential distribution function, wherein the exponential distribution function is formulated as:

$$\frac{S \times (1 - e^{-\lambda(n+d)}) \times w}{n \times c}$$

where S represents a resource limit per time frame, n represents the number of active API clients, w represents the current time window, $\lambda$ represents the tunable scaling factor, d represents a multiplier, and C represents a configurable constant;
if the quota has been exceeded for the API client for the current time window, determining whether an exception is applicable;
if the quota has not been exceeded for the API client for the current time window, preparing a proxied request and forwarding the proxied request to one or more API endpoints referenced in the client request from the API client; and
adjusting a value of the current time window to change a volume per timeframe.

7. The proxy system of claim 6, wherein C is 3600.

8. The proxy system of claim 6, wherein the instructions are further translatable by the at least one processor to perform:
adjusting the tunable scaling factor to account for burst behavior of the API client; or
adjusting the value of the current time window and the tunable scaling factor.

9. The proxy system of claim 6, wherein the instructions are further translatable by the at least one processor to perform:
tracking a number of client requests from the API client for the current time window; and
comparing the number of client requests from the API client for the current time window with the quota of requests allowed for the API client for the current time window.

10. The proxy system of claim 6, wherein the instructions are further translatable by the at least one processor to perform:
tracking the number of active API clients, wherein tracking the number of active API clients comprises:
determining whether the API client is already connected; and
if the API client is not already connected:
marking the API client as connected; and
incrementing a counter tracking the number of active API clients.

11. A computer program product comprising at least one non-transitory computer readable medium storing instructions translatable by at least one processor to perform:
receiving a client request from an API client;
calculating a quota of requests allowed for the API client for a current time window based at least in part on a number of active API clients during the current time window and a tunable scaling factor, wherein the quota of requests allowed for the API client for the current time window is calculated using an exponential distribution function, wherein the exponential distribution function is formulated as:

$$\frac{S \times (1 - e^{-\lambda(n+d)}) \times w}{n \times c}$$

where S represents a resource limit per time frame, n represents the number of active API clients, w represents the current time window, λ represents the tunable scaling factor, d represents a multiplier, and C represents a configurable constant;

if the quota has been exceeded for the API client for the current time window, determining whether an exception is applicable;

if the quota has not been exceeded for the API client for the current time window, preparing a proxied request and forwarding the proxied request to one or more API endpoints referenced in the client request from the API client; and adjusting a value of the current time window to change a volume per timeframe.

12. The computer program product of claim 11, wherein C is 3600.

13. The computer program product of claim 11, wherein the instructions are further translatable by the at least one processor to perform:

adjusting the tunable scaling factor to account for burst behavior of the API client; or adjusting the value of the current time window and the tunable scaling factor.

14. The computer program product of claim 11, wherein the instructions are further translatable by the at least one processor to perform:

tracking a number of client requests from the API client for the current time window; and comparing the number of client requests from the API client for the current time window with the quota of requests allowed for the API client for the current time window.

15. The computer program product of claim 11, wherein the instructions are further translatable by the at least one processor to perform:

tracking the number of active API clients, wherein tracking the number of active API clients comprises:
 determining whether the API client is already connected; and
 if the API client is not already connected:
  marking the API client as connected; and
 incrementing a counter tracking the number of active API clients.

* * * * *